(12) United States Patent
Stech

(10) Patent No.: US 6,206,400 B1
(45) Date of Patent: Mar. 27, 2001

(54) VARIABLE SIZED TRAILER BALL HITCH ASSEMBLY

(75) Inventor: Clyde G. Stech, Orlando, FL (US)

(73) Assignee: B. C. Cure, Inc., Apopka, FL (US)

( * ) Notice: Subject to any disclaimer, the term of this patent is extended or adjusted under 35 U.S.C. 154(b) by 0 days.

(21) Appl. No.: 09/305,224

(22) Filed: May 4, 1999

(51) Int. Cl.[7] ................. B60D 1/06; B60D 1/07
(52) U.S. Cl. ........................ 280/416.1; 280/511
(58) Field of Search ................ 280/415.1, 416.1, 280/511

(56) References Cited

U.S. PATENT DOCUMENTS

| | | | | |
|---|---|---|---|---|
| 4,230,336 | * | 10/1980 | Acrea et al. ................. | 280/507 |
| 4,319,766 | * | 3/1982 | Corteg et al. ................. | 280/511 |
| 4,772,039 | * | 9/1988 | Cook ................. | 280/415 |
| 5,085,452 | * | 2/1992 | Janeiro ................. | 280/511 |

* cited by examiner

Primary Examiner—Kevin Hurley
Assistant Examiner—Kevin McKinley
(74) Attorney, Agent, or Firm—Taylor & Aust, P.C.

(57) ABSTRACT

A variable-sized ball hitch assembly for connecting a vehicle with a trailer hitch. The variable-sized ball hitch assembly includes a body, with a first ball and a second ball that are connected together by a stem, each ball having a different diameter. Each ball has a respective outermost end surface. A central axis extends longitudinally through each ball and through the stem. The stem has a cross-sectional dimension which is somewhat less than the diameter of the first ball and the diameter of the second ball. The body has at least one elongate bore which is substantially concentric with the central axis of the body and extends inwardly from the respective outermost end surfaces of the first ball and the second ball. The body is selectively oriented upon the first end of an elongate shaft so as to present one of the two differently sized balls to the vehicle hitch. The second end of the elongate shaft is inserted into and affixed to the trailer hitch.

12 Claims, 1 Drawing Sheet

VARIABLE SIZED TRAILER BALL HITCH ASSEMBLY

BACKGROUND OF THE INVENTION

1. Field of the Invention

The present invention relates to ball type hitch assemblies for removably coupling a boat, utility, or other type of trailer to a structural member or hitch of a towing vehicle.

2. Description of the Related Art

Ball type hitches are commonly used in the towing of various types of vehicles, trailers, and the like (hereinafter referred to collectively as "trailers"). Trailers range in size from larger and heavier cargo and camping trailers down to smaller utility trailers. Typically, trailers that are hauled by automobiles are used on an intermittent basis. Therefore, the towing vehicle and the trailer are configured with interlocking hitch components in order to enable coupling and decoupling of the trailer and towing vehicle as required.

Hitch assemblies for trailers generally resemble a ball and socket joint. The ball typically includes a body having a spherical portion that is fixed to a stem. The stem extends through an opening in the structural member or hitch of the towing vehicle. A nut threadably engages the bottom of the stem, thereby affixing the stem to the structural member or hitch of the towing vehicle. The trailer vehicle is typically provided with a hemispherical socket to receive the ball. The socket and the ball are then interlocked to prevent separation of the ball from the socket during use.

Ball and socket dimensions are not standardized. Larger trailers are typically equipped with a socket intended to receive a ball having a spherical diameter of two inches. Smaller trailers are typically equipped with a socket intended to receive a ball having a spherical diameter of one and seven-eighths inches. This lack of standardization requires an individual who may use different trailers to possess a two inch diameter hitch sball and a one and seven-eighth inch diameter hitch ball in order to ensure proper and safe mating with the particular trailer in use. One of the problems presented by this lack of standardization is that the hitch ball that is not in use may become lost or misplaced.

What is needed in the art is a single ball type hitch that can be oriented to present either of two diameters, thereby enabling proper coupling with most types of trailers.

SUMMARY OF THE INVENTION

The present invention provides a variable sized ball hitch assembly including an elongate stem attachable to the hitch or structural member of a towing vehicle, and a body having two differently sized ball members that is attachable to the elongate stem. The ball hitch assembly may be configured to present either of two differently sized ball portions in order to properly mate with the socket of a trailer.

The invention comprises, in one form thereof, a body, having a first ball and a second ball that are connected together by a stem, each ball having a different diameter. Each ball has a respective outermost end surface. A central axis extends longitudinally through each ball and through the stem. The stem has a cross-sectional dimension which is somewhat less than the diameter of the first ball and the diameter of the second ball. The body has at least one elongate bore which is substantially concentric with the central axis of the body and extends inwardly from the respective end surfaces of the first ball and the second ball. The body is selectively oriented upon the first end of an elongate shaft so as to present one of the two differently-sized ball members to the vehicle hitch. The second end of the elongate shaft is inserted into and affixed to the trailer hitch.

An advantage of the present invention is that trailers requiring ball hitches of different size can be quickly and securely attached to a vehicle.

Another advantage is that the variable sized ball hitch assembly can quickly and easily be oriented so as to present a ball hitch of the appropriate size to securely mate with a trailer requiring a ball hitch of a particular size.

Yet another advantage is that the variable sized ball hitch assembly eliminates the need to maintain an inventory of several ball hitches of various sizes.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
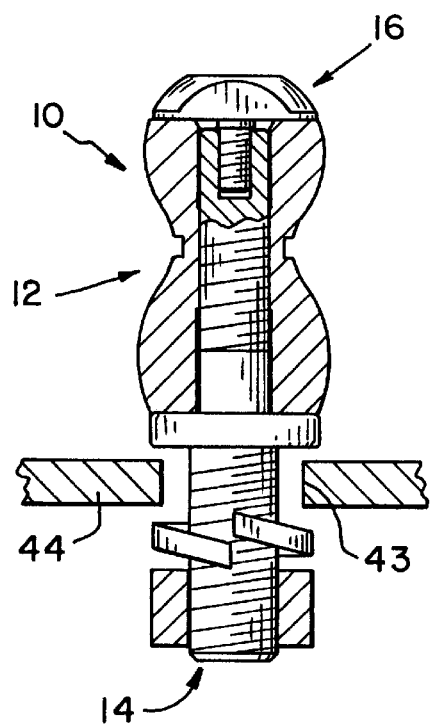
FIG. 1 is a side, partially sectional view of one embodiment of an interchangeable ball hitch assembly of the present invention.

With reference to the Figures, there is shown an embodiment of the interchangeable ball hitch assembly of the present invention, generally designated 10 in FIG. 1. Interchangeable ball hitch assembly 10 includes a body 12, an elongate shaft 14, and a bolt 16.

Figure 2A:
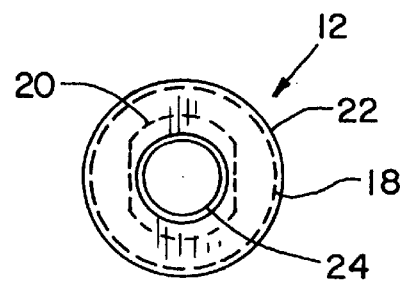
FIG. 2A is a top sectional view of the body of the interchangeable ball hitch assembly of FIG. 1.

Referring now to FIG. 2A, the body 12 includes a first ball member 18 interconnected by narrowed stem 20 to a second ball member 22, and an elongate bore 24. First ball 18 has a diameter 19 being somewhat smaller, or different, than the diameter 21 of the second ball 22. For example, in the embodiment shown, first ball 18 has a diameter of approximately 1.875 inches while second ball 22 has a diameter of approximately 2.0 inches. First ball member 18 has an outermost end surface 26, and second ball member 22 has an outermost end surface 28.

Elongate bore 24 is internally threaded and extends along the central longitudinal axis 30 of body 12 from outermost end surface 26, through first ball member 18 and second ball member 22, to outermost end surface 28, thereby interconnecting the elongate bore 24 with each of the outermost end surfaces 26 and 28.

Figure 3:
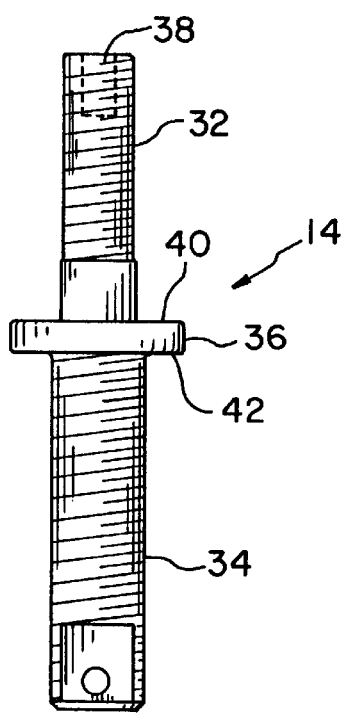
FIG. 3 is a view of the elongate shaft of the interchangeable ball hitch assembly of FIG. 1.

Referring now to FIG. 3, elongate shaft 14 has a first end 32, a second end 34, and a flange section 36 disposed therebetween. Both first end 32 and second end 34 of elongate shaft 14 are externally threaded. First end 32 of elongate shaft 14 has an internally-threaded hole 38.

First end 32 of elongate shaft 14 is received within, and threadably engages, elongate bore 24. First end 32 of elongate shaft 14 can be selectively inserted within elongate bore 24 from the direction of either outermost end surface 26 or outermost end surface 28.

Flange 36 has a first face 40 and a second face 42. First face 40 engages one of outermost end surfaces 26 and 28, into which elongate shaft 14 has been inserted. Second face 42 engages the hitch 44 (FIG. 1) of a towing vehicle (not shown).

Second end 34 of elongate shaft 14 is received within a hole 43 within vehicle hitch 44 and is attached thereto by a nut (not shown). Tightening the nut draws together second face 42 of flange 36 and hitch 44, thereby securely attaching elongate shaft 14 to hitch 44.

Figure 4:
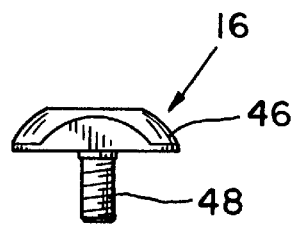
FIG. 4 is a view of the bolt of the interchangeable ball hitch assembly of FIG. 1.

Referring now to FIG. 4, bolt 16 has a head 46 and a stem 48. Stem 48 is externally threaded. Stem 48 is received within and threadably engages hole 38 of elongate shaft 14, thereby interconnecting body 12 with elongate shaft 14 and preventing any rotation of interchangeable hitch assembly 10.

Head 46 of bolt 16 has a curvature which is complementary to either of first ball member 18 and second ball member 22 so that, once inserted into hole 38 of elongate shaft 14, a substantially spherically-shaped ball structure results. Bolt 16 is then tightened, thereby securely affixing body 12 to elongate shaft 14, and preventing any rotation of interchangeable ball hitch assembly 10.

In use, in order to connect interchangeable ball hitch assembly 10 to vehicle hitch 44, second end 34 of elongate shaft 14 is inserted into hole 43 of vehicle hitch 44. A nut is then threaded upon second end 34 of elongate shaft 14. Tightening the nut draws together second face 42 of flange 36 and hitch 44, thus securely affixing elongate shaft 14 to hitch 44.

Elongate bore 24 of body 12 is then placed over or threaded upon first end 32 of elongate shaft 14 from one of two possible directions. For example, elongate bore 24 of body 12 can be placed over or threaded upon first end 32 of elongate shaft 14 so that first end 32 of elongate shaft 14 enters elongate bore 24 from the direction of outermost end surface 28 of body 12, thereby selecting first ball member 18 to be in the outermost position relative to hitch 44. Alternatively, elongate bore 24 of body 12 can be placed over or threaded upon first end 32 of elongate shaft 14 so that elongate shaft 14 enters elongate bore 24 from the direction of outermost end surface 26, thereby selecting second ball member 22 to be in outermost position relative to hitch 44.

Bolt 16 is then inserted into hole 38 of elongate shaft 14. Tightening bolt 16 securely attaches body 12 to elongate shaft 14 thereby preventing any rotation of interchangeable ball hitch assembly 10. Head 46 of bolt 16 has a curvature that is complementary to either of first ball member 18 and second ball member 22, and therefore a substantially spherically-shaped ball structure is presented.

Figure 2B:
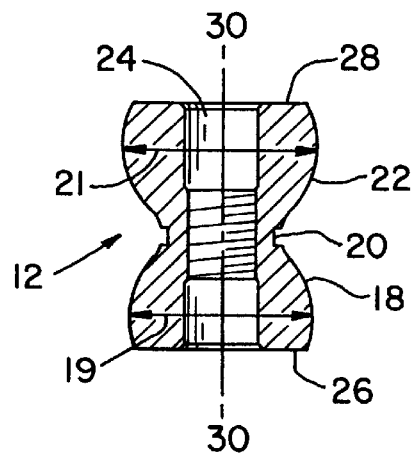
FIG. 2B is a side, sectional view of the body of FIG. 2A.

In the embodiment shown, elongate bore 24 is configured as one contiguous or continuous bore extending from outermost end surface 26 through to outermost end surface 28 (FIGS. 1 and 2). However, it is to be understood that elongate bore 24 may take various other forms to achieve the same purpose. For example, elongate bore 24 could take the form of two bores each extending into, but only partially through, body 12 from a respective one of end surfaces 26 and 28. Furthermore, elongate bore 24 is described herein as being internally threaded. It is to be understood that only a portion of elongate bore 24 need be internally threaded to threadably engage elongate shaft 14.

In the embodiment shown, stem 20 is configured (FIG. 2) as having opposing flat walls to facilitate the tightening of body 12 upon elongate shaft 14. It is to be understood that stem 18 could be alternatively configured to achieve the same purpose. For example, stem 20 could be configured as a hexagon, or contain various other features, thereby enabling insertion of a tightening tool.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An interchangeable ball hitch assembly for connecting a hitch of a towing vehicle to a trailer, said ball hitch assembly comprising:

a body having a first ball and a second ball, said first ball and said second ball connected together through a stem, said stem including opposing flat walls, said body having a central axis extending longitudinally through each of said first ball, said stem, and said second ball, said first ball having a first diameter, said second ball having a second diameter, said stem having a cross-sectional dimension, said first diameter being different from said second diameter, said cross-sectional dimension being less than each of said first diameter and said second diameter, said first ball and said second ball each having a respective outermost end surface, said body having at least one elongate bore extending inwardly from at least one of said outermost end surfaces, said elongate bore being generally concentric with said central axis of said body; and an elongate shaft having a longitudinal axis, a first end, and a second end, said first end extending into said at least one elongate bore from one of said outermost end surfaces and attached to said body.

2. The interchangeable ball hitch assembly of claim 1, wherein said at least one elongate bore comprises a single contiguous bore extending from said outermost end surface of said first ball through to said outermost end surface of said second ball.

3. The interchangeable ball hitch assembly of claim 2, further comprising a bolt, said bolt having a head and an externally threaded bolt stem, wherein said first end of said elongate shaft contains an internally threaded hole threadingly engaged with said bolt stem.

4. The interchangeable ball hitch assembly of claim 3, wherein said head of said bolt has a curvature which is complementary to each of said first ball and said second ball so as to present an approximately spherically shaped ball structure.

5. The interchangeable ball hitch assembly of claim 1, wherein said at least one elongate bore is internally threaded.

6. The interchangeable ball hitch assembly of claim 1, wherein at least one of said outermost end surface of said first ball and said outermost end surface of said second ball is substantially flat and oriented in a plane substantially perpendicular to said central axis of said body.

7. The interchangeable ball hitch assembly of claim 1, wherein each of said outermost end surface of said first ball and said outermost end surface of said second ball is substantially flat and oriented in a plane substantially perpendicular to said central axis of said body.

8. The interchangeable ball hitch assembly of claim 1, wherein said second end of said elongate shaft is externally threaded.

9. The interchangeable ball hitch assembly of claim 1, wherein said elongate shaft has a widened flange section disposed between said first end and said second end, said flange section having a first face and a second face, said first face engaging said one outermost end surface.

10. The interchangeable ball hitch assembly of claim 1, wherein the diameters of each of said first ball and said second ball are oriented substantially perpendicular to said central axis of said body.

11. A method of attaching an interchangeable ball hitch assembly to a vehicle hitch, comprising the steps of:

connecting an elongate shaft to the vehicle hitch, said elongate shaft having a first end extending from said hitch;

providing a ball hitch body having a first ball with a first diameter and a second ball with a second diameter, said first diameter being different from said second diameter, said first ball connected by a stem to said second ball, said stem including opposing flat walls, said stem having a cross-sectional dimension less than each of said first diameter and said second diameter, each of said first ball and said second ball having an outermost end surface, said body having at least one elongate bore extending inwardly from each of said outermost end surfaces, said body having a central axis extending longitudinally through each of said first ball, said second ball, and said stem, said bore being generally concentric with said central axis;

inserting said first end of said elongate shaft into said body from said outermost end of one of said first ball and said second ball; and attaching said first end of said elongate shaft to said body.

12. An interchangeable ball hitch assembly for connecting a hitch of a towing vehicle to a trailer, said ball hitch assembly comprising:

a body having a first ball and a second ball, said first ball and said second ball connected together through a stem, said body having a central axis extending longitudinally through each of said first ball, said stem, and said second ball, said first ball having a first diameter, said second ball having a second diameter, said stem having a cross-sectional dimension, said first diameter being different from said second diameter, said cross-sectional dimension being less than each of said first diameter and said second diameter, said first ball and said second ball each having a respective outermost end surface, each of said outermost end surface of said first ball and said outermost end surface of said second ball being substantially flat and oriented in a plane substantially perpendicular to said central axis of said body, said body having at least one elongate bore extending inwardly from at least one of said outermost end surfaces, said at least one elongate bore being generally concentric with said central axis of said body, said at least one elongate bore including a single contiguous bore extending from said outermost end surface of said first ball through to said outermost end surface of said second ball;

an elongate shaft having a longitudinal axis, a first end, and a second end, said first end extending into said at least one elongate bore from one of said outermost end surfaces and attached to said body; and a bolt, said bolt having a head and an externally threaded bolt stem, said first end of said elongate shaft containing an internally threaded hole threadingly engaged with said bolt stem, said bolt head having flat side, said flat side of said bolt head engaging one of said outermost end surface of said first ball and said outermost end surface of said second ball.

* * * * *